US006861082B2

(12) United States Patent
Laffont et al.

(10) Patent No.: US 6,861,082 B2
(45) Date of Patent: Mar. 1, 2005

(54) FROZEN DESSERT AND PROCESS OF MANUFACTURE

(75) Inventors: Jérôme Laffont, Beauvais (FR); Alain Gueroult, Goincourt (FR)

(73) Assignee: Nestec S.A., Vevey (CH)

( * ) Notice: Subject to any disclaimer, the term of this patent is extended or adjusted under 35 U.S.C. 154(b) by 501 days.

(21) Appl. No.: 09/888,982

(22) Filed: Jun. 25, 2001

(65) Prior Publication Data

US 2002/0015764 A1 Feb. 7, 2002

Related U.S. Application Data

(63) Continuation of application No. PCT/EP99/09799, filed on Dec. 10, 1999.

(30) Foreign Application Priority Data

Dec. 29, 1998 (EP) .............................. 98204458

(51) Int. Cl.⁷ ................................................ A23G 9/00
(52) U.S. Cl. .................. 426/95; 426/245; 426/244; 426/565; 426/303; 426/524; 426/515
(58) Field of Search ................ 426/95, 244, 245, 426/303, 524, 515, 565

(56) References Cited

U.S. PATENT DOCUMENTS

| | | | |
|---|---|---|---|
| 2,600,566 A | 6/1952 | Moffett, Jr. .................. 99/221 |
| 4,268,002 A | 5/1981 | Deveaux ..................... 249/127 |
| 4,368,684 A | 1/1983 | Launay ......................... 118/25 |
| 4,789,552 A | * 12/1988 | Speakman et al. .......... 426/107 |
| 4,794,008 A | * 12/1988 | Schmidt et al. ............. 426/234 |
| 4,874,618 A | 10/1989 | Seaborne et al. ............. 426/76 |
| 4,971,816 A | * 11/1990 | Clark et al. .................. 426/101 |
| 5,008,507 A | 4/1991 | Pesheck et al. ....... 219/10.55 E |
| 5,140,121 A | 8/1992 | Pesheck et al. ....... 219/10.55 E |
| 5,977,531 A | * 11/1999 | Pfister et al. ............... 219/725 |
| 6,060,099 A | * 5/2000 | Ito ............................. 426/243 |

FOREIGN PATENT DOCUMENTS

| | | |
|---|---|---|
| EP | 0 329 219 | 8/1989 |
| EP | 0 361 893 | 4/1990 |
| FR | 2 459 186 | 1/1981 |
| FR | 2 482 425 | 11/1981 |
| JP | 09299036 | 11/1997 |
| WO | WO 90/08710 | * 9/1990 |

* cited by examiner

Primary Examiner—N. Bhat
(74) Attorney, Agent, or Firm—Winston & Strawn LLP

(57) ABSTRACT

The invention is a frozen, microwavable dessert that includes a frozen confectionery core, a coating of semi-fluid composition having an insulating character with respect to microwaves, partially or completely surrounding the core, a layer of biscuit serving as support for the core-coating combination, the coating and the biscuit being arranged such that the core is completely surrounded, and a layer of sauce having microwave-absorbing character.

20 Claims, 3 Drawing Sheets

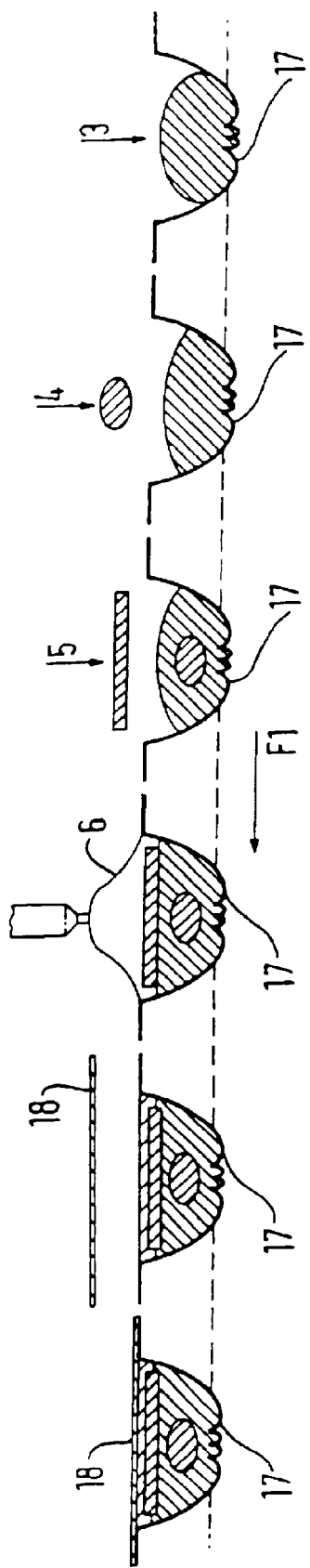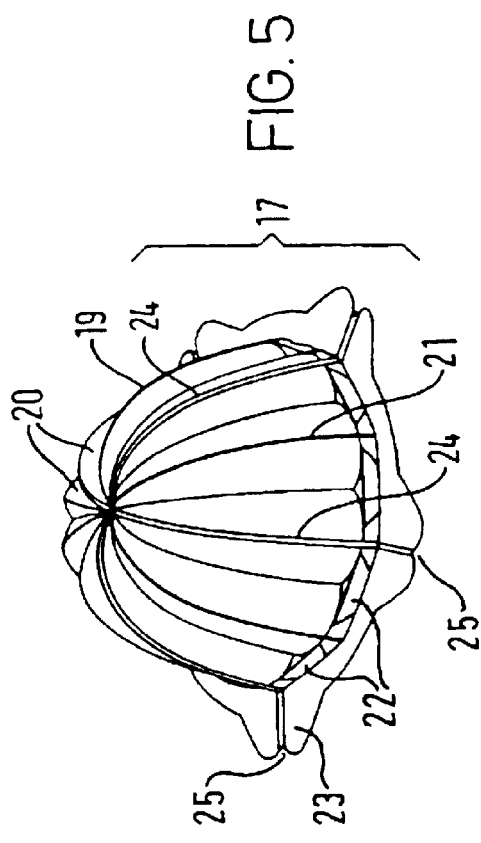
FIG. 4
FIG. 5

FROZEN DESSERT AND PROCESS OF MANUFACTURE

CROSS-REFERENCE TO RELATED APPLICATION

This application is a continuation of International Application No. PCT/EP99/09799 filed Dec. 10, 1999, now pending, the disclosure of which is expressly incorporated herein by reference thereto.

FIELD OF INVENTION

The invention relates to the field of frozen desserts ready to be consumed upon simple defrosting, such as in a microwave oven. It relates to a fully ready dessert that is easy to serve in portions with a sauce for domestic consumption and for large-scale consumers such as restaurants, community canteens, and caterers.

BACKGROUND OF THE INVENTION

The current trend in the field of frozen dessert is to provide the consumer with a prepared product, such as, for example, a frozen cake on a biscuit with a sauce, in particular a fruit puree, a cream, or a syrup, that can be prepared directly on a plate simply by opening a packaging of the "flow-pack" or blister type or by removing the dessert from a cup-shaped package, in particular made of formed plastic material.

A device for the manufacture of frozen dessert of the Norwegian omelet type is described, for example, in U.S. Pat. No. 4,268,002. Such a dessert consists of a biscuit base, an ice cream core placed on the biscuit, and a coating of the core with a semi-fluid aerated composition of the meringue type and contains no sauce.

U.S. Pat. No. 4,268,002 describes, for example, a packaging mold for frozen cake with covering syrup for family use. The configuration of the mold is such that the frozen confectionery is clearly separated from the syrup during filling, such that it is not necessary to package the syrup in a separate packaging. Such a dessert is not suitable for microwave heating.

Thus, there remains a need for frozen desserts which can be quickly and easily defrosted prior to and for consumption, and the present invention satisfies this need.

SUMMARY OF THE INVENTION

The invention relates to a frozen composite dessert that can be consumed after microwave heating, comprising a frozen confectionery core, a coating of semi-fluid composition having an insulating character with respect to microwaves, partially or completely surrounding the core, a layer of biscuit serving as support for the core-coating combination, the coating and the biscuit being arranged such that the core is completely surrounded, and a layer of sauce having microwave-absorbing character.

A core of frozen confectionery according to the invention may be an ice cream, a milk ice, a water ice, a sherbet, or a frozen fermented dairy product with a greater or lesser degree of overrun. Such a frozen confectionery may be composite, i.e., may contain several frozen compositions of a similar or different type that are juxtaposed, for example, in the form of superposed layers, in the form of concentric rings, or by radial sections, or alternatively, may be marbled with another frozen composition or with a sauce or a syrup. The frozen confectionery may contain inclusions in thin layers or in pieces, for example, of fatty composition of the chocolate type, based on sugar such as boiled sugar, praline, croquant, nougat, nougatine, caramel, or based on gel, gums. It may contain pieces of dry fruit, in puree form, candied, or alcohol-based. The frozen confectionery preferably contains 30% to 42% by weight of dry matter.

As a coating, the invention includes a semi-fluid composition for dessert that is aerated to a greater or lesser degree. This may be a flan, a rice cake, or a semolina cake, an egg-based cream, a Bavarian cream, or a beaten egg white, and is preferably sweetened. The coating may be a composition containing a gelling or thickening agent, such as, for example, a marshmallow. The coating composition may contain inclusions such as, for example, those mentioned above in combination with the frozen confectionery. According to the invention, it is preferable that the coating composition constitutes an insulator with respect to the microwaves. The insulator is preferably predominantly composed of proteins and carbohydrates and contains relatively little fat and little water. The insulator also contains 42% to 50% by weight of dry matter. It is advantageously aerated, preferably with a high overrun, of the order of 100% to 300% by volume.

BRIED DESCRIPTION OF THE DRAWINGS

The characteristics and advantages of the invention emerge from the description below of an embodiment of the invention given by way of example with reference to the appended schematic drawings. The parts and percentages are by weight, unless otherwise stated. In the drawings:

FIG. 4 is an overall view of a second embodiment of the manufacture of the dessert, showing the various operations; and FIG. 5 is a perspective view of a mold serving as packaging for the dessert.

DETAILED DESCRIPTION OF THE INVENTION

Figure 1:
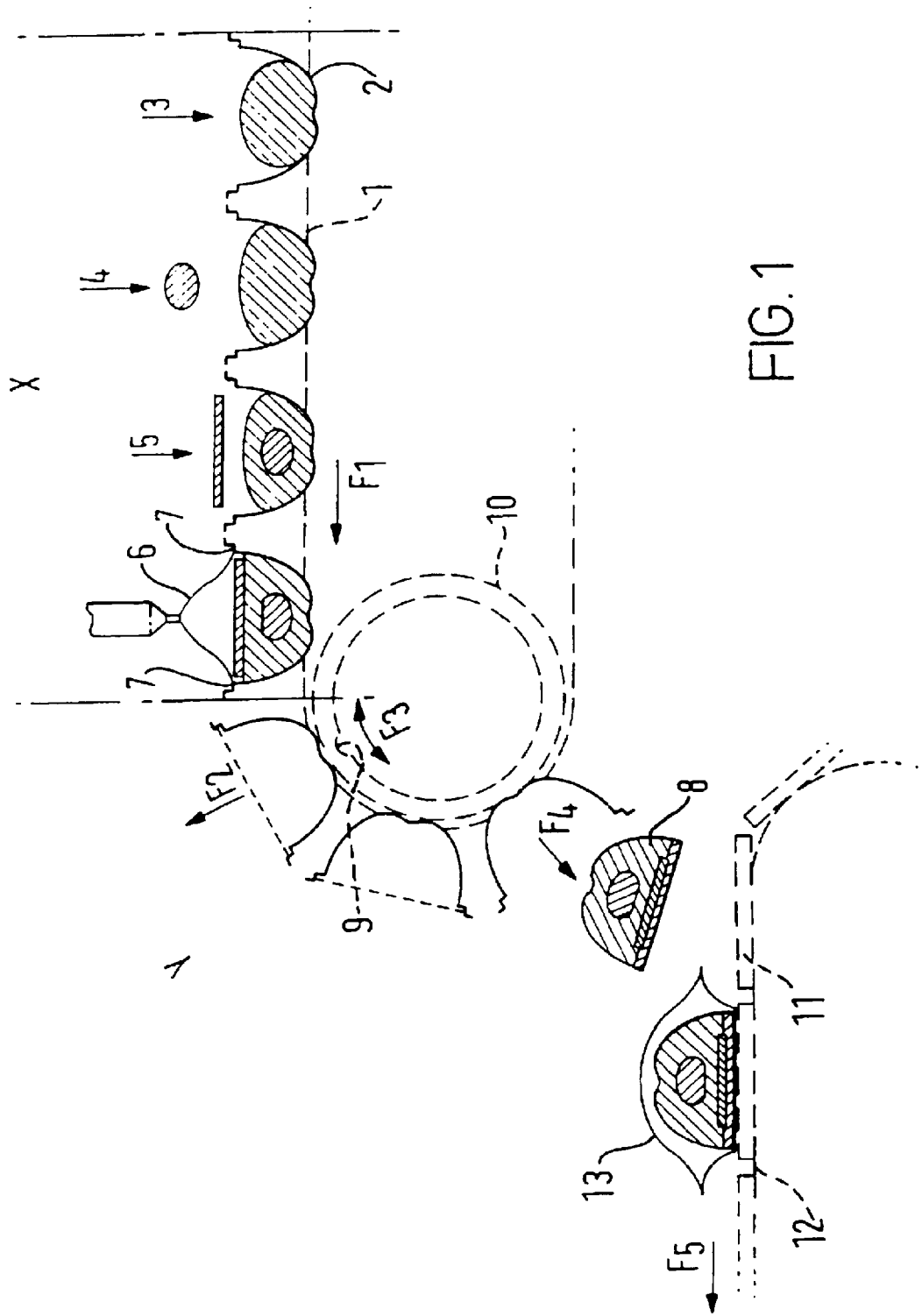
FIG. 1 is an overall view of an embodiment of the manufacture of the dessert, showing the various operations.

The frozen composite dessert of the present invention is formulated with components and ingredients so that it can be consumed after simple microwave heating.

The layer of biscuit serving as support may consist of any biscuit that can be used in frozen confectionery of the sandwich, cake, or cone type. This may be a wafer, a puff dough biscuit, such as filo dough or strudel dough, or a biscuit reconstituted by agglomeration of particles with a binder. The dry matter content is preferably 70% to 90% by weight. The layer is preferably a genoese-type cake dough. By virtue of its constitution, such a biscuit constitutes an insulator with respect to microwaves. Furthermore, the biscuit should absorb the minimum of sauce which has become liquid both during the dispensing and during the reconstitution for consumption.

In contrast with the composition of the frozen confectionery, of the coating layer and of the biscuit which have a relatively low water content, the layer of sauce has a relatively high water content so as to constitute an absorbent for the microwaves. The dry matter content is 35% to 70% by weight, and the coating may be a fruit puree, broth, or syrup, or a milk and egg-based pastry cream, such as, for example, a custard. In the case of a fruit-based sauce, the dry matter content may be relatively high, even though the sauce contains a relatively large quantity of free water. In the case of a chocolate-based sauce or cream, the quantity of dry matter may be relatively low and a relatively high portion of the water may be bound. Such a sauce may contain inclusions, preferably in the form of small pieces.

This assembly of the different constituents of the dessert produces contrasts in texture, color, taste, and temperature during consumption. The assembly of the different constituents of the dessert also produce a geometric arrangement that affects the degree of microwave heating. Thus, the core of frozen confectionery is placed so as to be attacked by the microwaves later than the sauce. The fact that the sauce is placed at a site close to the tray of a microwave oven favors it being attacked first, since what is found in the vicinity of the tray becomes heated first depending on the distribution of the waves. Similarly, the thickness of the biscuit, preferably from 5 mm to 10 mm, maintains in height the core of the frozen confectionery and keeps it away from the tray to delay heating thereof.

The invention also relates to a process for the manufacture of the preceding frozen dessert, wherein the following successive operations are carried out: an open mold with its opening at the top is filled with a semi-fluid composition and with a frozen confectionery composition such that the semi-fluid composition surrounds the frozen confectionery composition, a biscuit is deposited, a liquid sauce is dispensed, and the mold and its content are rapidly frozen.

The frozen content can be removed from the mold and packaged in packets or in blister packs, and then the packets or blister packs may be packed in cardboard boxes. Where appropriate, the dessert may be removed from the mold by the consumer, and in this case the mold is part of the packaging and the dessert is then packaged in its mold and the whole is, where appropriate, packed in, for example, cardboard boxes.

According to the process, successive layers of the different constituents are prepared. According to the process, the sauce is dispensed after depositing the biscuit. One advantage of this manner of proceeding is to facilitate the separation of the different layers.

Preferably, the mold may be in the form of a cup, having a generally hemispherical shape that may have an embossed side wall and festoons arranged radially from the summit, giving a decorative appearance to the mold, while serving as stiffeners. At its summit, the cup may have a depression or concavity in order to facilitate the removal of the product from the mold.

Near its opening, the mold advantageously contains a track the purpose of which is, in cooperation with the biscuit, to keep the sauce separated from the coating composition until the different layers have been frozen.

In the embodiment allowing the molding and the packaging of the dessert, and the removal from the mold by the consumer, the dessert may be dispensed directly into the final mold which also serves as packaging. The mold advantageously contains a flat edge onto which a lid may be applied, by adhesive bonding or sealing, for example, by thermosealing, after having dispensed the various constituents of the dessert. The lid may contain a peeling or tearing initiator so that it can be removed and the dessert made available. The mold can itself be torn by the final consumer. In the latter case, it is advantageously thermoformed. The flat edge advantageously contains one or more precut slits that form an initiator during opening by facilitating and orienting the tearing. Preferably, the mold contains crest lines that aid the guiding of the tearing. Once most of the product has been made bare, the mold can be manually removed without the product being touched with fingers.

The removal from the mold may also be carried out by applying pressure to the top of the mold without destroying the packaging. In this case, it may be manufactured by thermoforming or by injection and may be expanded up to about 3% by volume or may not be expanded. In this mode of removal from the mold, the shape of the packaging is important. In particular, it is possible to provide for a grooving on the crest lines which creates a differential break between reinforced gadroons (one out of two, one out of three, or one out of four) and simple gadroons that facilitate the detachment of the product from the surface of the mold during the application of pressure over a high point. The grooving has the further advantage of allowing penetration of air, and of thus promoting the detachment of the product from the inner surface of the mold.

The mold may be metallic, for example, made from pressed aluminum, or preferably from plastic. It is possible to use any thermoformable or injection moldable food grade plastic, such as, for example, polyvinyl chloride, polypropylene, polyethylene, polystyrene, polycarbonate, with polystyrene being preferred in the case of a disposable mold. It is also possible to use a copolymer or a composite material. The material used should have a thickness such that it is sufficiently rigid.

In the embodiment where the dessert is removed from the mold by the consumer, the mold is preferably made of expanded and filled plastic material so as to permit easy removal from the mold of the dessert. The material may be polystyrene, polypropylene, polyethylene, or polyester expanded up to 30%, preferably up to 10% by volume, and more preferably expanded by 2% to 7% by volume. The filler may be any customary inorganic material. In the case of an expanded plastic material, the filler facilitates tearing by providing a rupture in the plastic material that is elastic in nature. Furthermore, the filler modifies the characteristics of adhesion between the packaging and the dessert by eliminating the suction effect that is generally induced by contact between a cavity made of plastic whose inner surface is smooth, the mold, and a moist product. The materials are chosen in order to obtain a good compromise between the rigidity necessary for handling the mold on the production line, its capacity to be bent in order to release the dessert during the removal from the mold, and its weak force of adhesion to the product. The thickness of such a mold is 0.1 mm to 2 mm, and preferably 0.2 mm to 0.5 mm.

The process thus includes filling moving molds successively with a semi-fluid composition, a core of frozen confectionery that, by displacing part of the semi-fluid composition, places itself at the center of the latter, the deposition of a biscuit whose shape is adapted to enter into the mold, and then the dispensing of the sauce. It is not necessary for the shape of the biscuit to fit that of the mold.

These operations may take place during the passage of the molds in a brine bath or by rapid cryogenic cooling in a freezing tunnel, for example, with nitrogen or with very cold air. It is also possible to freeze the product in a conventional freezing tunnel.

In one preferred embodiment, once hardened at least on the surface, the combination of the different layers forming the content of the mold is removed, for example, after heating superficially and turning over the molds, and then packaged in a flow-pack packaging or deposited on a blister and packed into cardboard boxes. The whole is conveyed to a hardening tunnel.

As a variation, the product is not removed and is packaged with its mold. The mold is closed with a lid and the packaged products are placed in an external packaging made of, for example, cardboard boxes, and are then conveyed to a hardening tunnel.

Referring to FIG. 1, an endless chain 1 moving stepwise transports the molds 2 with their opening at the top in the direction of the arrow F1 in a freezing zone X. This zone contains cooling means (not shown), includes, for example, a brine bath in which the molds 2 move, carried by frames. The cooling zone may also contain a circulating gaseous cryogenic fluid, such as, for example, air or nitrogen at the surface of the molds. It is possible to use these cooling means individually. It is also possible to carry out the freezing in a conventional freezing tunnel after having filled the molds on a simple chain outside the tunnel.

A semi-fluid composition of egg white 3 beaten firm into a meringue, containing about 46% dry matter, having an overrun of about 175% by volume, is deposited at the bottom of the mold 2. A core of ice cream 4 having a dry matter content of about 32% and an overrun of about 100% by volume, is then dispensed by, for example, means of a diaphragm dispensing head. Because of the difference in density between the egg white and the ice cream, the core of ice cream penetrates into the layer of egg white and displaces a portion of it which comes and covers the core and spreads at the surface. It is also possible to carry out these two dispensings simultaneously by using, for example, a concentric dispensing device.

A biscuit 5, such as, for example, a genoese, having a generally circular shape that fits the shape of the mold and comes close to its wall, is then deposited. A liquid sauce 6 having a water content of 30% to 65% depending on its nature, is finally dispensed. The sauce 6 occupies the track 7 of the mold 2, which cooperates with the biscuit 5 to contribute towards separating the sauce 6 from the other constituents, in particular the egg white 3.

The mold 2 then leaves the freezing zone X and is heated from the bottom by, for example, contact with hot brine (not shown) and then passes into an unmolding zone Y (where the product is removed from the mold). The frozen content of the mold 2 is represented by block 8, including the assembly of the various constituents, is detached from the mold 2 along F2, by means of the cam 9 that performs a back-and-forth movement along F3, but which may also be fixed. The frozen content is then removed from the mold by tipping over the mold and by being released along F4 by turning over the mold 2 on the wheel 10 at the end of the chain 1.

The block 8, once turned over, is taken on a plate 11 of the endless chain 12 moving stepwise along F5, and is then packaged in a transparent flow-pack packaging 13. The whole is packed in a cardboard box and conveyed to a hardening tunnel (not shown).

In the case where the filling of the mold 2 is carried out on a simple chain (not shown), the product is then hardened in its mold by passing through a freezing tunnel, and the product is transported in its mold head facing downwards and with the sauce at the top, and is then heated in an infrared tunnel, which causes the sauce to detach from the mold. The product is then removed from the mold after being turned over.

Figure 2:
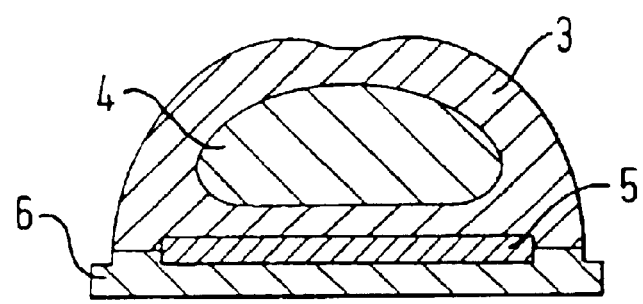
FIG. 2 is a cross section of the frozen dessert once removed from the mold.

Referring now to FIG. 2, the frozen dessert includes, by volume of dessert, a core 4 of vanilla ice cream representing about 30%, a coating of egg white 3 made into a raspberry-based meringue representing about 50%, a genoese biscuit 5 representing about 10%, and a red-fruit-based sauce 6 representing about 10%. In a second example, the core 4 is a rum ice cream containing pieces of rum-treated grapes, the coating 3 an egg white made into a coffee meringue, and the sauce 6 a chocolate sauce. In a third example, the core 4 is a vanilla ice cream, the coating 3 an egg white made into a vanilla meringue, and the sauce 6 a custard. In a fourth example, the core 4 is a pear sherbet, the coating 3 an egg white made into a pear meringue, and the sauce 6 a chocolate sauce.

Figure 3:
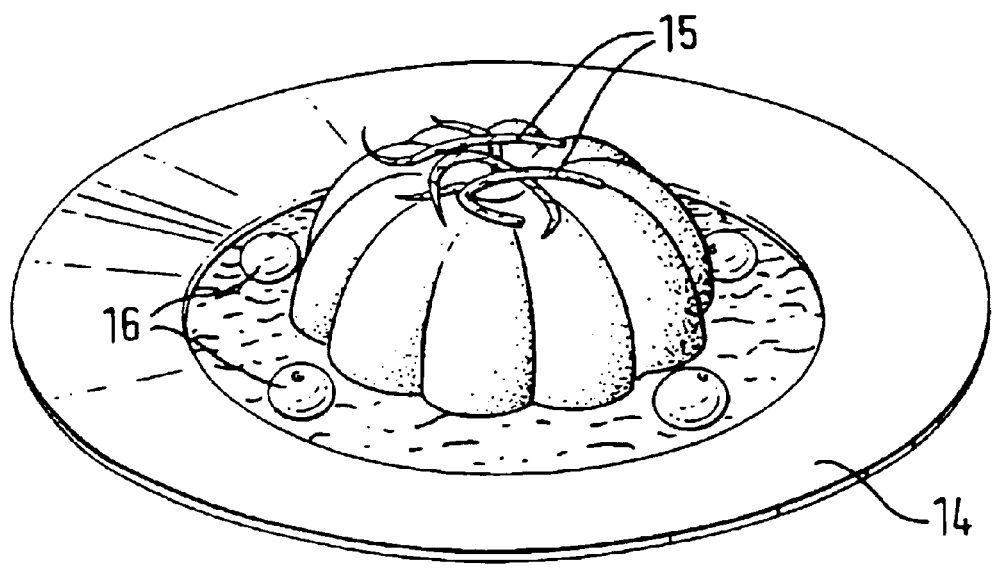
FIG. 3 is a perspective view of the dessert once heated and ready for consumption.

FIG. 3 shows the dessert once it has passed through a 900 watt microwave oven for about 20 seconds, on a plate 14. The sauce 6 melts and spreads on the plate. The fact that the sauce has melted is a good indicator that the product is ready to be served or consumed, independently of the duration of microwave treatment or the effective power of the oven. Indeed, an overheating of the product may cause the melting of the core, whereas an insufficient heating does not allow the sauce to melt. The coating of meringue 3 remains firm, like the biscuit 5 and the core 4. The preparation of the dessert is very simple and very rapid. Of course, the dessert may be consumed like a conventional frozen dessert rapidly after having been removed from the freezer or after tempering at room temperature.

Another advantage of the dessert according to the invention is that the preparation of the product can be easily embellished by the addition of decorative supplements 15, 16, such as, for example, candied fruit pieces on the coating and small red fruits in the sauce.

Referring to FIG. 4, the various successive operations of filling the mold 17 with the constituents 3, 4, 5, and 6 are carried out, and then the filled mold 17 is closed with a lid 18 that is sealed by thermosealing. The filled and closed molds are then transferred, placed in boxes, and conveyed to a hardening tunnel (not shown).

In FIG. 5, the mold 17 consists of a cup 19 with gadroons 20 having crest lines 21. The bottom of the dome is provided with a track 22 to contain the sauce 6. The track ends with a flat edge 23 that serves as a seat for the lid (not shown). Some crest lines 21 contain a groove, such as 24, in the extension of the cuts, such as 25, to permit the initiation of a tear in the mold. The product can then be removed from the mold by the final consumer or the restaurant owner.

As used herein, "gadroons" refers to a band of convex molding that can be ornamentally flourished.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A frozen dessert capable of being heated in a microwave, comprising:
    a frozen confectionery core;
    a semi-fluid coating at least partially or completely surrounding the core to inhibit or prevent microwaves from heating the core;
    a biscuit supporting the core and coating, the coating and the biscuit being arranged such that the core is completely surrounded thereby; and
    a sauce poured over the core, coating, and biscuit so that the sauce absorbs microwaves.

2. The dessert of claim 1, wherein the sauce is liquefied so that the dessert is ready to be consumed.

3. The dessert of claim 1, wherein the core is placed at the geometric center of the dessert, the sauce is placed upon a tray in a microwave oven, and the biscuit has a thickness of 5 to 10 mm to keep the core above and away from the tray.

4. The dessert of claim 1, wherein the core comprises 30% to 42% by weight dry matter, the coating comprises 42% to 50% by weight dry matter, and the sauce comprises 35% to 70% by weight dry matter.

5. The dessert of claim 1, wherein the core comprises one or more of an ice cream, a milk ice, a water ice, a sherbet, or a frozen fermented dairy product.

6. The dessert of claim 1, wherein the coating is aerated and comprises one or more of an egg-based cream, a Bavarian cream, flan, or a beaten egg white.

7. The dessert of claim 1, wherein the biscuit also provides insulation from microwaves and has a dry matter content of 70% to 90% by weight.

8. The dessert of claim 1, wherein the biscuit comprises a wafer, puff dough, or reconstituted biscuit material.

9. The dessert of claim 1, wherein the sauce comprises one or more of a fruit puree, syrup, or a milk and egg-based pastry cream.

10. The dessert of claim 1, wherein the coating comprises at least 50% protein and carbohydrate materials.

11. The dessert of claim 1, wherein the coating is overrun by 100% to 300% by volume.

12. The dessert of claim 1, wherein the sauce includes a higher water content than the coating on the biscuit, so as to absorb more microwaves during warming.

13. A process for the manufacture of a frozen dessert, comprising:
    filling an open mold with a semi-fluid composition and with a frozen confection, such that the semi-fluid composition at least partially surrounds the frozen confection which forms a core;
    placing a biscuit into the mold, wherein the biscuit has a sufficient size and composition to absorb microwaves;
    pouring a liquid sauce into the mold; and
    freezing the mold.

14. The process of claim 13, wherein the core is placed within the semi-fluid composition, thereby displacing a part of the semi-fluid composition.

15. The process of claim 13, wherein the core is disposed at the geometric center of the mold and the semi-fluid composition completely surrounds the core.

16. The process of claim 13, which further comprises:
    removing the dessert from the mold;
    packaging the dessert in a plurality of packets or blister packs; and
    packing the packets or blister packs in boxes.

17. The process of claim 13, which further comprises:
    closing the mold with a lid; and
    packaging the mold in an external package.

18. The process of claim 13, wherein the mold comprises a hemispherical cup, having an embossed side wall and festoons arranged radially from its summit to provide the mold with a decorative appearance and to stiffen the mold, the cup further having a depression or concavity to facilitate removing the dessert from the mold, and the mold also having a track to maintain the sauce separated from the coating composition until the mold has been frozen.

19. The process of claim 18, wherein the side wall of the mold includes gadroons with a crest line, the gadroons being reinforced or grooved on the crest line, and wherein the mold further comprises a flat edge serving as a base for a closing lid, the flat edge being split so as to constitute an opening initiator.

20. A method for heating a frozen confectionery product including a sauce, a coating, and a biscuit, while inhibiting melting of a frozen core therein, which comprises:
    disposing the product on a tray in a microwave so that the biscuit and the coating completely surround the core and so that the core is above and away from the tray; and
    heating the product with microwaves while inhibiting or avoiding melting of the frozen core.

* * * * *